United States Patent [19]
Sato et al.

[11] Patent Number: 5,523,814
[45] Date of Patent: Jun. 4, 1996

[54] METHOD AND APPARATUS FOR CONTROLLING A RETRACTABLE CAMERA BARREL

[75] Inventors: Muneyoshi Sato; Michihiro Shiina; Fumio Iwai, all of Oomiya, Japan

[73] Assignee: Fuji Photo Optical, Co., Ltd., Oomiya, Japan

[21] Appl. No.: 258,397

[22] Filed: Jun. 13, 1994

[30] Foreign Application Priority Data

Jun. 14, 1993 [JP] Japan ................................. 5-142366

[51] Int. Cl.$^6$ ................................................ G03B 17/04
[52] U.S. Cl. ................................ 354/187; 354/195.1
[58] Field of Search ........................... 354/187, 195.1, 354/195.12, 202

[56] References Cited

U.S. PATENT DOCUMENTS 5,153,626  10/1992  Yamamoto ..................... 354/187
5,359,381  10/1994  Miyazawa et al. ............. 354/187 X

*Primary Examiner*—Howard B. Blankenship
*Attorney, Agent, or Firm*—Hickman Beyer & Weaver

[57] ABSTRACT

A camera includes a lens barrel which can be retracted into a camera body, and a lens barrel storage control apparatus. The lens barrel has a front lens group mounted in a front end portion thereof and a rear lens group movably disposed therein. The lens barrel storage control apparatus controls a DC motor for retracting the lens barrel, if the rear lens group is in a safe area where it will come into no contact with a film in retracting the lens barrel into the camera body, and then controls a stepping motor for locating the rear lens group to a final standby position after completion of storage. On the other hand, if the rear lens group is out of the safe area, the control apparatus controls the stepping motor for locating the rear lens group to the rearmost position in the safe area, and controls the DC motor for retracting the lens barrel.

21 Claims, 10 Drawing Sheets

METHOD AND APPARATUS FOR CONTROLLING A RETRACTABLE CAMERA BARREL

BACKGROUND OF THE INVENTION

1. Field of the Invention

The present invention relates to a so-called retractable barrel camera which is arranged such that a lens barrel of zoom system can be retracted into a camera body, and more particularly to a control in retracting the lens barrel.

2. Related Background Art

A recent demand is to reduce the outer dimensions of camera, particularly of compact camera. Especially, an important subject is to miniaturize a lens barrel as much as possible. To miniaturize the lens barrel, a recent trend in camera having the two-lens-group zoom system is to replace a mechanical cam system with a mechanism for driving the front lens group and the rear lens group by separate motors.

An example of the two lens group zoom system is one as shown in FIGS. 1A and 1B. A lens barrel 4 of the zoom system 2 is composed of a stationary barrel 6 forming a part of camera body 7, an intermediate barrel 8 telescopically stored in the stationary barrel 6, and a movable barrel 10 telescopically stored in the intermediate barrel 8.

A front lens group (FLG) 22 which consists of one or more lenses is fixed in a front end portion of the moving barrel 10 and is arranged to be driven by a direct current (DC) motor (not shown in FIGS. 1A and 1B) to move backward and forward together with the moving barrel 10.

Also, a rear lens group (RLG) 28 which consists of one or more lenses is arranged behind the front lens group 22 (on the camera body side) in the moving barrel 10 so as to be movable backward and forward. The rear lens group 28 is driven backward and forward by a stepping motor (not shown in FIGS. 1A and 1B).

FIG. 1A indicates an extreme telephoto state in which the focal length is longest and FIG. 1B indicates an extreme wide-angle state in which the focal length is shortest.

It is general in the two-group zoom system 2 as described above that in a non-photographic condition the moving barrel 10 and intermediate barrel 8 are further retracted into the stationary barrel 6 from the extreme wide-angle state to store the entire lens barrel 4 at the retracted position in the camera body.

However, for example, if the lens barrel 4 is moved to the retracted position while keeping the rear lens group 28 at the position in the extreme wide-angle state, the rear lens group 28 could come into contact with a film F so as to result in damaging the film F. It can be contemplated in order to solve such a problem that before the lens barrel 4 is stored in the camera body, the rear lens group 28 is first moved to a predetermined standby position close to the front lens group 22 and that thereafter the lens barrel 4 starts being retracted.

Starting the lens barrel storage process, this method, however, takes a considerable time for moving the rear lens group 28 to the forward standby position, for example if the zoom system 2 was in the extreme wide-angle state, which could give a user such an impression that the camera is out of operation during the time before the lens barrel 4 starts moving.

SUMMARY OF THE INVENTION

It is, therefore, an object of the present invention to provide a lens barrel storage control apparatus and method which can start moving the lens barrel to the retracted position as soon as possible after start of the lens barrel storage process.

According to one aspect of the present invention, there is provided a camera comprising: a camera body; a lens barrel arranged as movable backward and forward relative to the camera body; a first motor for driving the lens barrel; a front lens group coaxially mounted in a front end portion of the lens barrel; a rear lens group coaxially disposed in the lens barrel behind the front lens group so as to be independently movable backward and forward; a second motor for driving the rear lens group; and a lens barrel storage control apparatus for controlling the first motor and the second motor in storing the lens barrel at a retracted position in the camera body, the lens barrel storage control apparatus including: (i) rear lens group position detecting means for detecting a position of the rear lens group with respect to the lens barrel; (ii) means for driving the first motor to retract the lens barrel to the retracted position in the camera body, if the rear lens group position detecting means detects that the rear lens group is located within a safe area in the lens barrel where the rear lens group will never come into contact with a film in retracting the lens barrel to the retracted position in the camera body; and (iii) means for driving the first motor and the second motor to retract the lens barrel to the retracted position in the camera body after locating the rear lens group at a predetermined rear position in the safe area, if the rear lens group position detecting means detects that the rear lens group is not located within the safe area.

Also, according to another aspect of the present invention, there is provided a lens barrel storage control method for use in a camera having a camera body, a lens barrel arranged as movable backward and forward relative to the camera body, a first motor for driving the lens barrel, a front lens group coaxially mounted in a front end portion of the lens barrel, a rear lens group coaxially disposed in the lens barrel behind the front lens group so as to be independently movable backward and forward, and a second motor for driving the rear lens group, the lens barrel storage control method comprising the steps of: detecting a position of the rear lens group with respect to the lens barrel; driving the first motor to retract the lens barrel to the retracted position in the camera body, when detecting that the rear lens group is located within a safe area in the lens barrel where the rear lens group will never come into contact with a film in retracting the lens barrel to the retracted position in the camera body; and driving the first motor and the second motor to retract the lens barrel to the retracted position in the camera body after locating the rear lens group at a predetermined rear position in the safe area, when detecting that the rear lens group is not located within the safe area.

As described above, even if the rear lens group is not located at the final standby position but if it is located within the safe area of the lens barrel, the storage of lens barrel is started as it is, under a judgement that there is no possibility of interference with the film upon lens barrel storage.

Meanwhile, if the rear lens group is located out of the safe area, the rear lens group will come into contact with the film when the lens barrel is stored as it is. Accordingly, the lens barrel is stored after the rear lens group is first moved to the rear position in the safe area, preferably to the rearmost position. In this case, the moving distance of rear lens group is very short and the time for storage start of lens barrel is largely decreased as compared with the prior art camera.

The present invention will become more fully understood from the detailed description given hereinbelow and the attached drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1A:
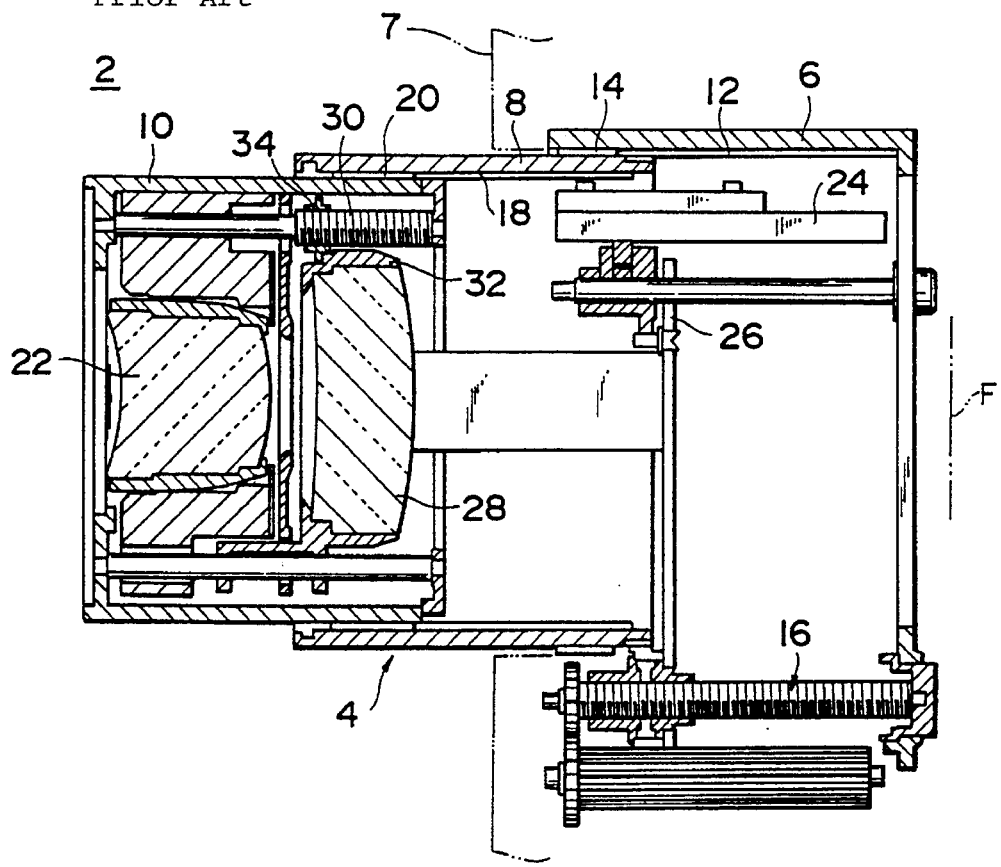
FIG. 1A is a cross sectional view to show the construction of a two lens group zoom system in a camera to which the present invention is applied, showing the extreme telephoto state.

A two-lens-group zoom system in a camera to which the present invention is applied is the same as one described with FIGS. 1A and 1B, but the structure thereof will be described in more detail in order to further clarify the content of the present invention.

A lens barrel 4 of zoom system 2 is of a three-barrel arrangement composed of a stationary barrel 6 forming a part of camera body 7, an intermediate barrel 8 telescopically stored in the stationary barrel 6, and a moving barrel 10 telescopically stored in the intermediate barrel 8.

A spiral groove 12 is formed on the internal surface of the stationary barrel 6, and an engaging portion 14 provided on the outer surface of end portion of the intermediate barrel 8 is meshed with the spiral groove 12. The intermediate barrel 8 is arranged as rotatable in normal and reverse directions by a direct current (DC) motor (not shown in FIGS. 1A and 1B) through a transmission mechanism 16, so that it can extend and contract relative to the stationary barrel 6 with its rotation.

A spiral groove 18 is also formed on the internal surface of the intermediate barrel 8, and an engaging portion 20 on the outer surface of end portion of the moving barrel 10 is meshed with the spiral groove 18. The moving barrel 10 is arranged as incapable of rotating relative to the stationary barrel 6, so that it telescopically moves in the same direction as the telescopic motion of the intermediate barrel 8 when the intermediate barrel 8 is rotated.

A front lens group (FLG) 22 which consists of one or more lenses is fixed in a front end portion of the moving barrel 10. Accordingly, the front lens group 22 is moved back and forth when drive of the DC motor is controlled to telescopically move the intermediate barrel 8 and the moving barrel 10. Thus, the DC motor functions as a driving motor of the front lens group 22. Numeral 24 designates a position sensor, which detects a position of a moving member 26 moving together with the intermediate barrel 8. Since a position of FLG 22 is uniquely determined by the position of the intermediate barrel 8, the position of the front lens group 22 can be detected from an output signal from the position sensor 24 whenever necessary.

Also, a rear lens group (RLG) 28 which consists of one or more lenses is arranged behind the front lens group 22 (on the camera body side) within the moving barrel 10 so as to be movable backward and forward. Although FIGS. 1A and 1B lacks clarity, a two-phase stepping motor is set as the rear lens group driving motor inside the moving barrel 10, and a female screw member 34 integral with a lens frame 32 for the rear lens group 28 is in mesh with a feed screw 30 connected to a rotation shaft of the stepping motor. Accordingly, the rear lens group 28 moves backward and forward by controlling the drive of the stepping motor.

A home position (reference position) of the rear lens group 28 is a position where the rear lens group 28 is closest to the front lens group 22, and there is a home position sensor (not shown in FIGS. 1A and 1B) provided in the moving barrel 10 to detect if the rear lens group 28 is located at the home position. A position of the rear lens group 28 is calculated from a cumulative pulse number of stepping motor driven from the home position. Various types of home position sensors can be employed in the present invention. The present embodiment employs a limit switch, which is turned on when the rear lens group 28 is located at the home position.

Figure 2:
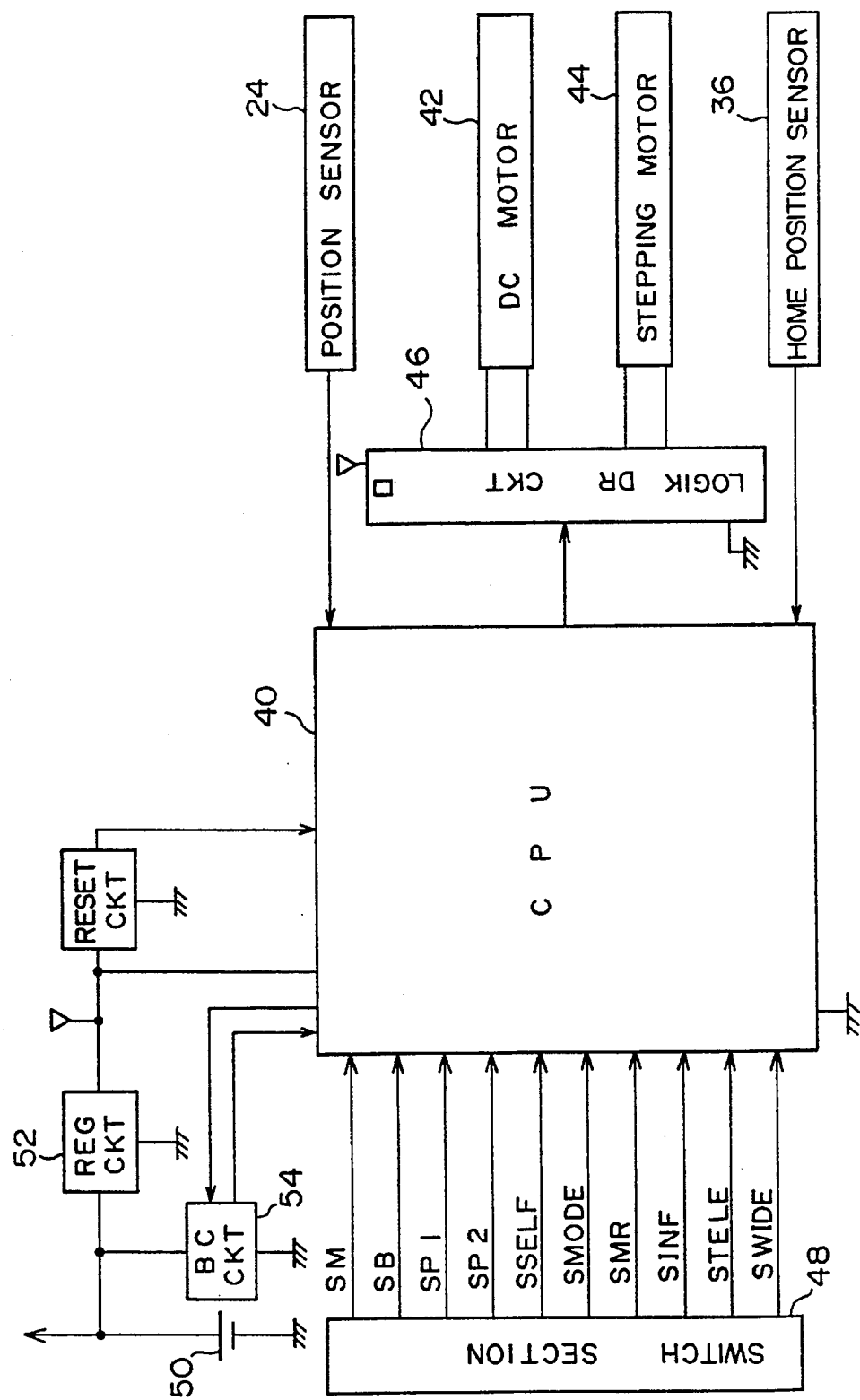
FIG. 2 is a block diagram to show a one-chip type microcomputer; or CPU constituting a lens barrel storage control apparatus according to the present invention.
Figure 3A:
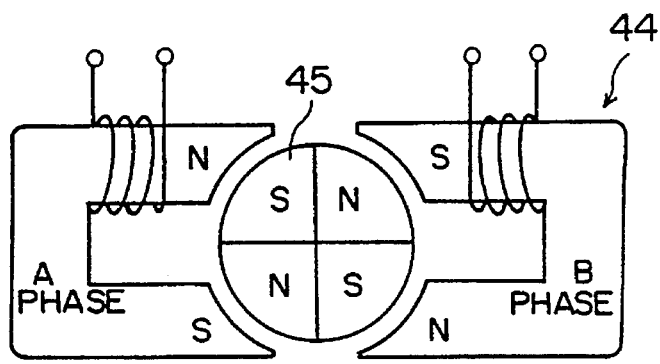
FIGS. 3A to 3D are conceptual drawings to show the structure and operation of a stepping motor for driving a rear lens group in zoom system, respectively.
Figure 3B:
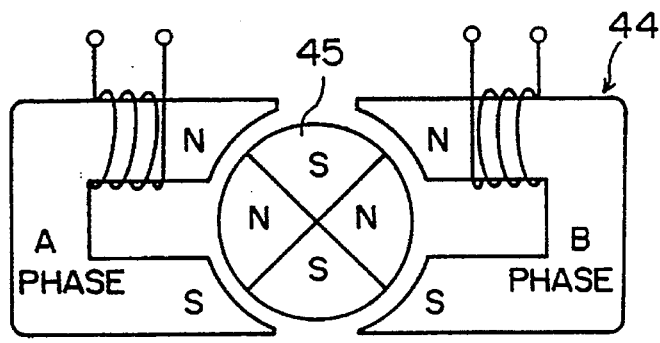
Figure 3C:
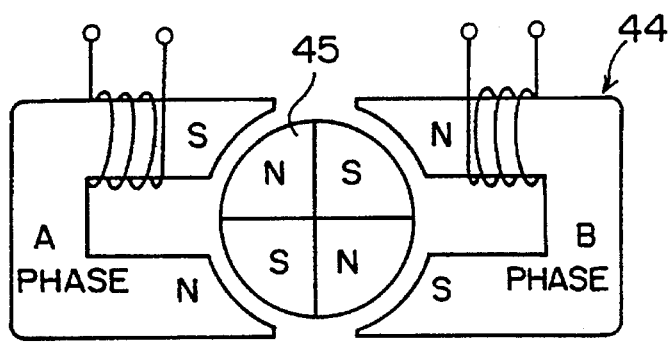
Figure 3D:
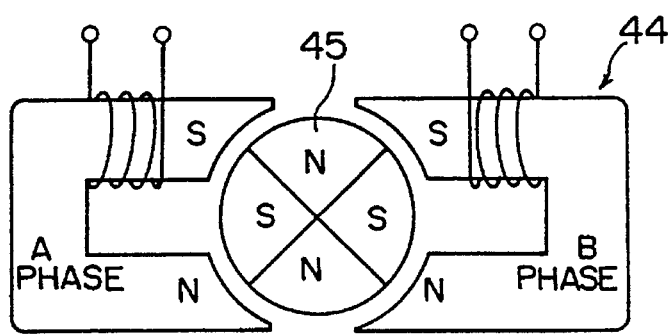

A lens barrel storage control apparatus according to the present invention for retracting the lens barrel 4 of such zoom system 2 to a collapsed position or retracted position is mainly constructed with a one-chip type microcomputer (referred to as "CPU" in this specification and the attached drawings) 40, as shown in FIG. 2. The DC motor 42 for driving the front lens group 22 or the lens barrel 4 and the stepping motor 44 for driving the rear lens group 28 are connected to CPU 40 through a logic driver circuit 46. The logic driver circuit 46 can control rotation and brake of the DC motor 42 while properly applying a high voltage or a low voltage to the DC motor 42 in accordance with a signal from CPU 40. Also, CPU 40 generates pulse signals to the stepping motor 44 in accordance with an energization pattern as shown in the below table, so that A phase and B phase of stepping motor 44 can be suitably energized.

In the below table, an rear lens group pointer (RLG pointer) is RAM data, and CPU 40 energizes the phases of stepping motor 44 in an energization pattern depending upon a value of RLG pointer to move the rear lens group 28 to a next phase. FIGS. 3A to 3D are conceptual drawings to show the structure and operation of stepping motor 44 used in the camera in the present embodiment. In FIGS. 3A to 3D show states of RLG pointers "0" to "3", respectively. As seen from FIGS. 3A to 3D, if pulse signals are output in such a cyclic pattern that the value of RLG pointer increases point by point from "0" to "3" and again returns to "0", a rotator 45 of stepping motor 44 normally rotates to move the rear lens group 28 backward, i.e., in the direction to leave the front lens group 22. Also, with pulse signals in such a cyclic pattern that the value of RLG pointer decreases point by point from "3" to "0" and again returns to "3", the stepping motor 44 is reversely rotated to move the rear lens group 28 forward.

TABLE 1

| RLG Pointer | Stepping Motor | |
| --- | --- | --- |
| | A Phase | B Phase |
| 0 | Normal | Normal |
| 1 | Normal | Reverse |
| 2 | Reverse | Reverse |
| 3 | Reverse | Normal |

Also, a switch section 48 is connected to CPU 40. The switch section 48 includes a main switch (SM), a back lid switch (SB), release switches (SP1, SP2) interlocked with a shutter button, a self timer switch (SSELF), a strobe mode switch (SMODE), a forcible rewind switch (SMR), an INF switch (SINF) for shooting of distant view, a zoom switch (STELE) for zooming to the telephoto side, a zoom switch (SWIDE) for zooming to the wide-angle side, etc., on/off signals of which are supplied to CPU 40.

Further connected to CPU 40 are a position sensor 24 for detecting a position of the front lens group 22 and a home position sensor 36 for detecting the home position of the rear lens group 28.

Further, a battery 50 is connected to CPU 40 through a regulator circuit (REG circuit) 52. The battery 50 also functions as a drive power source for the DC motor 42 and the stepping motor 44 in the zoom system 2. Also, a battery check circuit (BC circuit) 54 is connected to the battery 50 to perform battery check, for example to check a voltage of battery 50, by a control signal from CPU 40 and to supply information of the check to CPU 40.

Next described along the flowcharts in FIG. 4 to FIG. 10 is a control in retracting the lens barrel, as executed by CPU 40 in the above arrangement.

Figure 4:
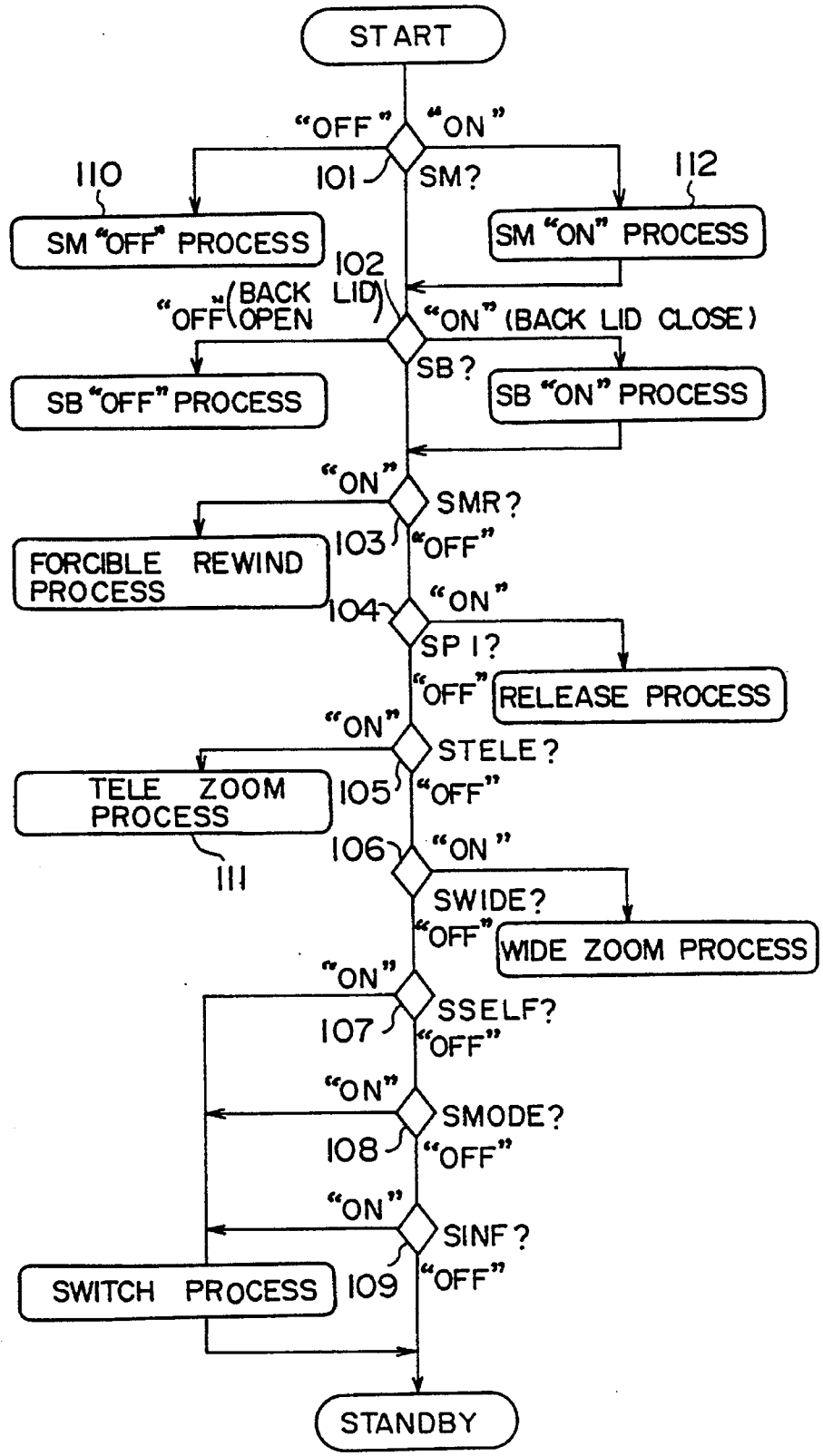
FIG. 4 is a flowchart to show an embodiment of processes before the camera reaches a standby state.

First, FIG. 4 is a flowchart between loading of film into the camera and a standby state (photographable state). Namely, sequential decisions are made as to if the main switch (SM) is turned on (Step 101), if the back lid switch (SB) is turned on after the back lid is closed (Step 102), if the forcible rewind switch (SMR) is off (Step 103), if the shutter button is not pressed while keeping the release switch (SP1) off (Step 104), if the telephoto zoom switch (STELE) is kept off (Step 105), if the wide-angle zoom switch (SWIDE) is kept off (Step 106), the self timer switch (SSELF) is off (Step 107), if the strobe mode switch (SMODE) is off (Step 108), and if the INF switch (SINF) is off (Step 109). If the above conditions all are satisfied, the camera goes into a standby state. Once the camera goes into the standby state, Step 101 to Step 109 are repeated.

Figure 1B:
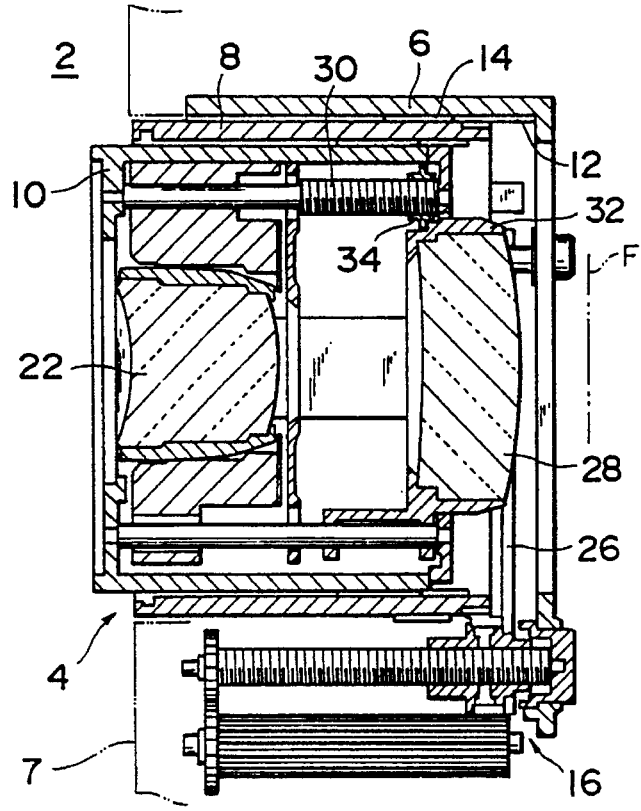
FIG. 1B is a view similar to FIG. 1A, showing the extreme wide-angle state.

With the camera in the standby state, the lens barrel 4 of zoom system 2 is located between the position in the extreme telephoto state shown in FIG. 1A and the position in the extreme wide-angle state shown in FIG. 1B. A process to retract the lens barrel 4 to the retracted position in the camera body 7 is started if the main switch (SM) is turned off or if the camera is not operated for a certain time period. The following description concerns an SM "OFF" process executed when the main switch (SM) is turned off (Step 110). The retracted position of lens barrel 4 in the present embodiment is a position where the moving barrel 10 and the intermediate barrel 8 are further retracted from the position in the extreme wide-angle state shown in FIG. 1B into the stationary barrel 6.

Figure 5:
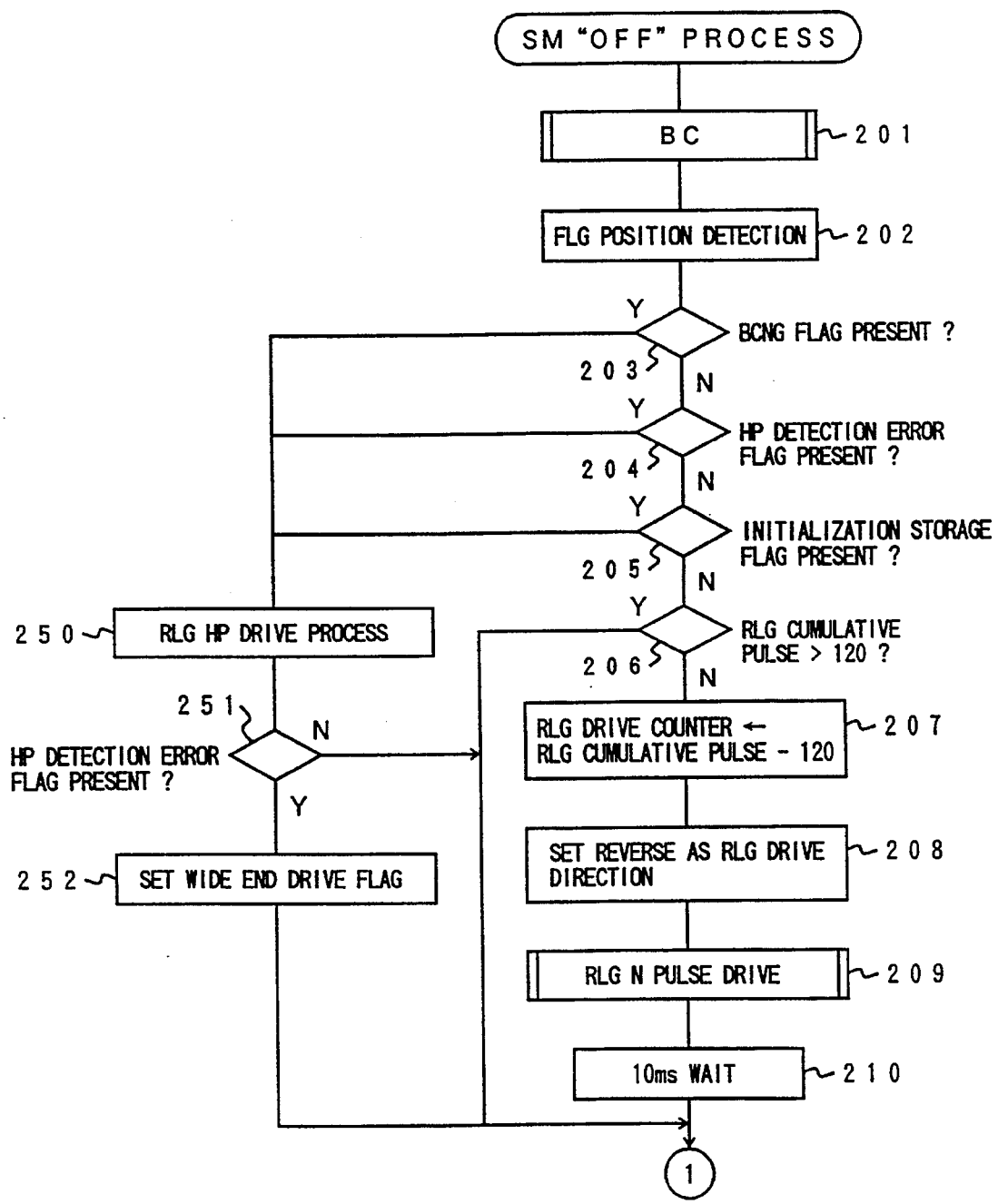
FIG. 5 is a flowchart to show an embodiment of SM "OFF" process executed by the lens barrel storage control apparatus of the present invention.
Figure 6:
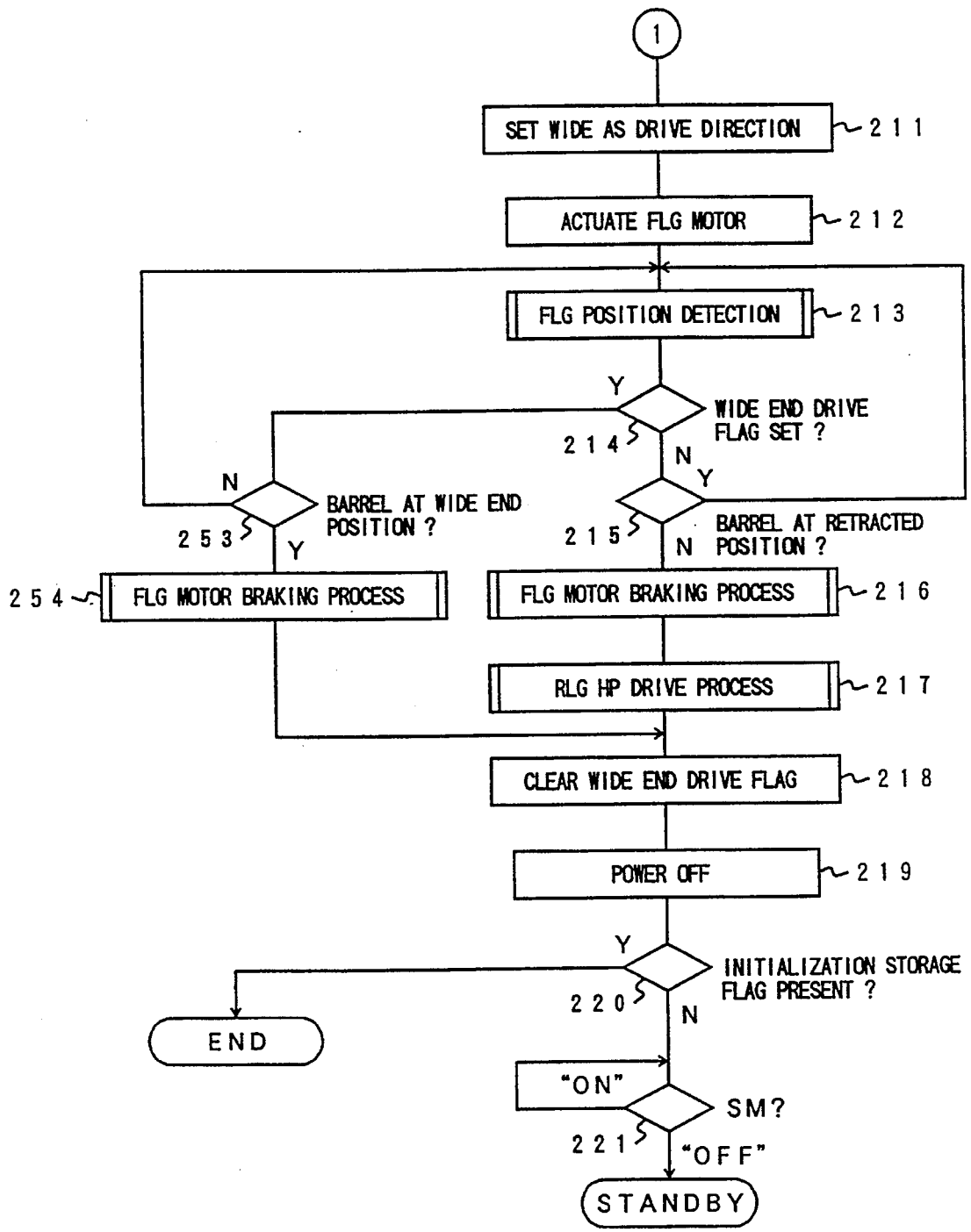
FIG. 6 is a flowchart to follow the SM "OFF" process in FIG. 5.

In the SM "OFF" process, as shown in FIGS. 5 and FIG. 6, a battery check (BC) process is first executed to measure a voltage of battery 50 and a decision is made as to if the voltage is not more than a predetermined value. If the voltage is not more than the predetermined value, a BCNG flag is set under the assumption that an abnormality could occur in the following processes (Step 201). Then the position of front lens group 22 is detected from a signal from the position sensor 24 (Step 202).

After that, subsequent decisions are-made as to if there is a BCNG flag set, if there is an HP detection error flag set, and if there is an initialization storage flag set (Steps 203 to 205). The HP detection error flag is a flag to be set when the rear lens group 28 is not normally moved to the home position though the rear lens group 28 should have been moved to the home position in another process, for example in the telephoto-side zooming process (Step 111 in FIG. 4). Further, the initialization storage flag is a flag to be set when the camera is initialized (for example in battery exchange). Processes with these flags being set will be described later, and here is a case where the flow proceeds to Step 206, further described below.

Processes after Step 206 are such processes that if the main switch (SM) is turned off while the rear lens group 28 is in a safe area in the lens barrel 4, i.e., in a region where the rear lens group 28 does not come into contact with the film F when the lens barrel is stored, the lens barrel 4 is retracted without moving the rear lens group 28 and that if the rear lens group 28 is in a rear region out of the safe area, i.e., in a risky area where the rear lens group 28 could come into contact with the film F when the lens barrel is retracted, the lens barrel 4 is retracted after the rear lens group 28 is moved to a rear position in the safe area. These processes permit storage of lens barrel 4 to be started at the same time or within a very short time when the main switch (SM) is turned off.

To enable the processes, first of all, it is necessary to make a decision as to if the rear lens,group 28 is in the safe area by detecting the position thereof. Since it can be considered in this case that since neither the BCNG flag, the HP detection error flag nor the initialization storage flag is assumed to be set, an actual position is coincident with the position of rear lens group 28 obtained from a cumulative number of pulse signals or RLG cumulative pulse number output to the stepping motor 44. Thus, at Step 206 a decision is made as to if the RLG cumulative pulse number is greater than "120".

The zoom system 2 of this embodiment is so arranged that if the RLG cumulative pulse number is "120", the rear lens group 28 is located at the rearmost position in the safe area. If the rear lens group 28 is located before this position and if the RLG cumulative pulse number is not more than "120", the flow proceeds from Step 206 directly to Step 211 to move the front lens group 22 backward without moving the rear lens group 28 whereby the lens barrel 4 is stored at the retracted position.

On the other hand, if the RLG cumulative pulse number is greater than "120", the rear lens group 28 is within the risky area and the lens barrel 4 is not to be retracted as it is. Therefore, the rear lens group 28 must be moved into the safe area. In order to move the rear lens group 28 into the safe area within a shortest time, the stepping motor 44 is to be pulse-driven until the RLG cumulative pulse number becomes "120". First at Step 207, "120" is subtracted from the RLG cumulative pulse number at that moment to obtain a pulse number necessary for moving the rear lens group 28 there, and the value is set in the RLG drive counter. Then, because the moving direction of rear lens group 28 is forward, the drive direction of stepping motor 44 is set to the reverse direction (Step 208), and the stepping motor 44 is pulse-driven by the pulse number set in the RLG drive counter (Step 209).

Figure 7:
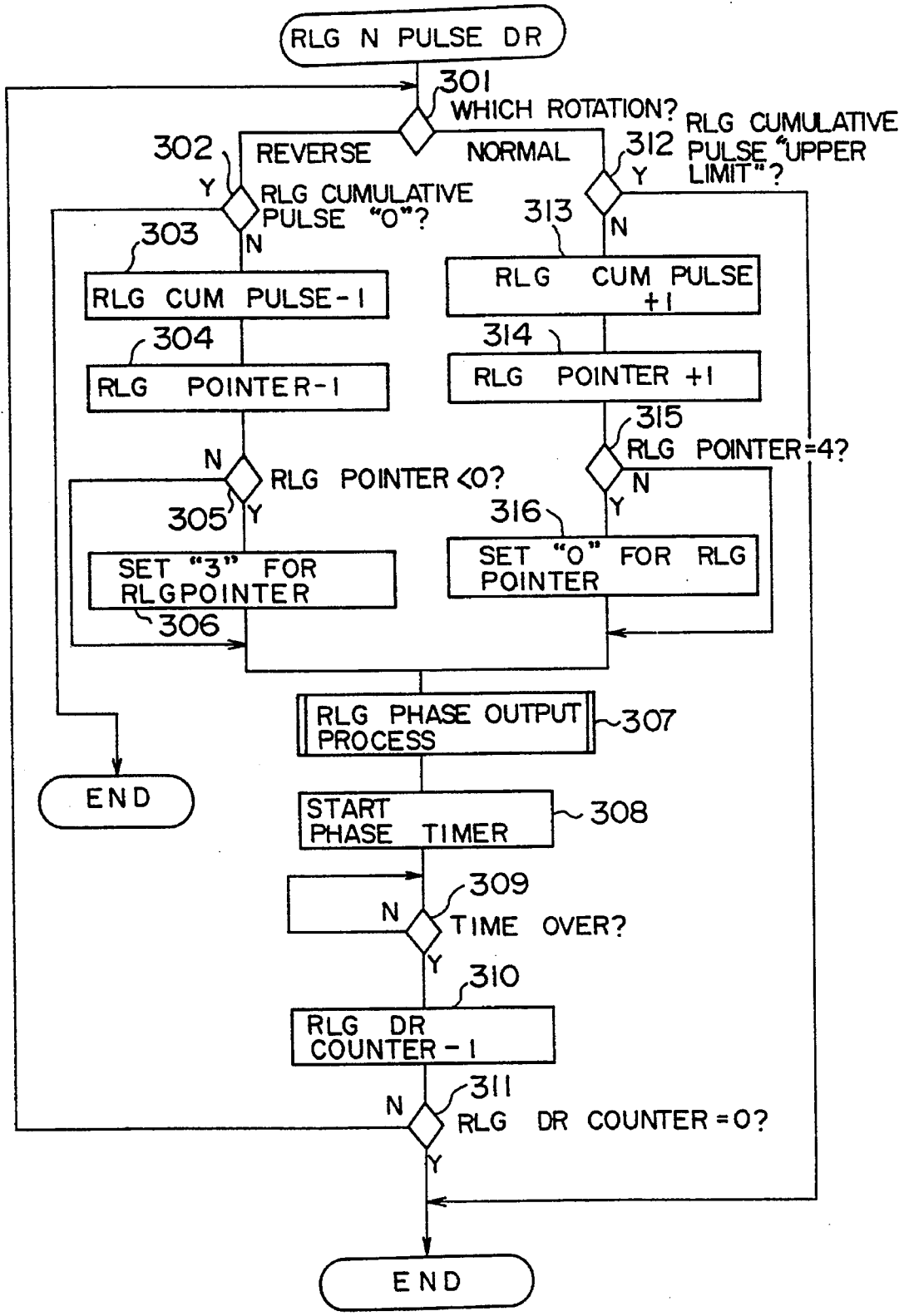
FIG. 7 is a flowchart to show an embodiment of RLG N pulse drive process executed by the lens barrel storage control apparatus of the present invention.

The flowchart of FIG. 7 shows the detailed process at Step 209. In this process, the flow first proceeds from Step 301 to Step 302, because the drive direction of stepping motor 44 is set as the reverse direction. Since the RLG cumulative pulse number is not "0" in this case, the flow goes to Step 303 to subtract "1" from the RLG cumulative pulse number. This is a process for subtraction of one pulse, because the rear lens group 28 will be moved one pulse forward in the process at Step 307.

Next, "1" is subtracted from the value of RLG pointer corresponding to the phase of stepping motor 44 at present (Step 304), and at below Step 307 the stepping motor 44 is driven to a next phase. In case the value of RLG pointer is negative, "3" is set as the value of RLG pointer (Steps 305, 306).

Figure 8:
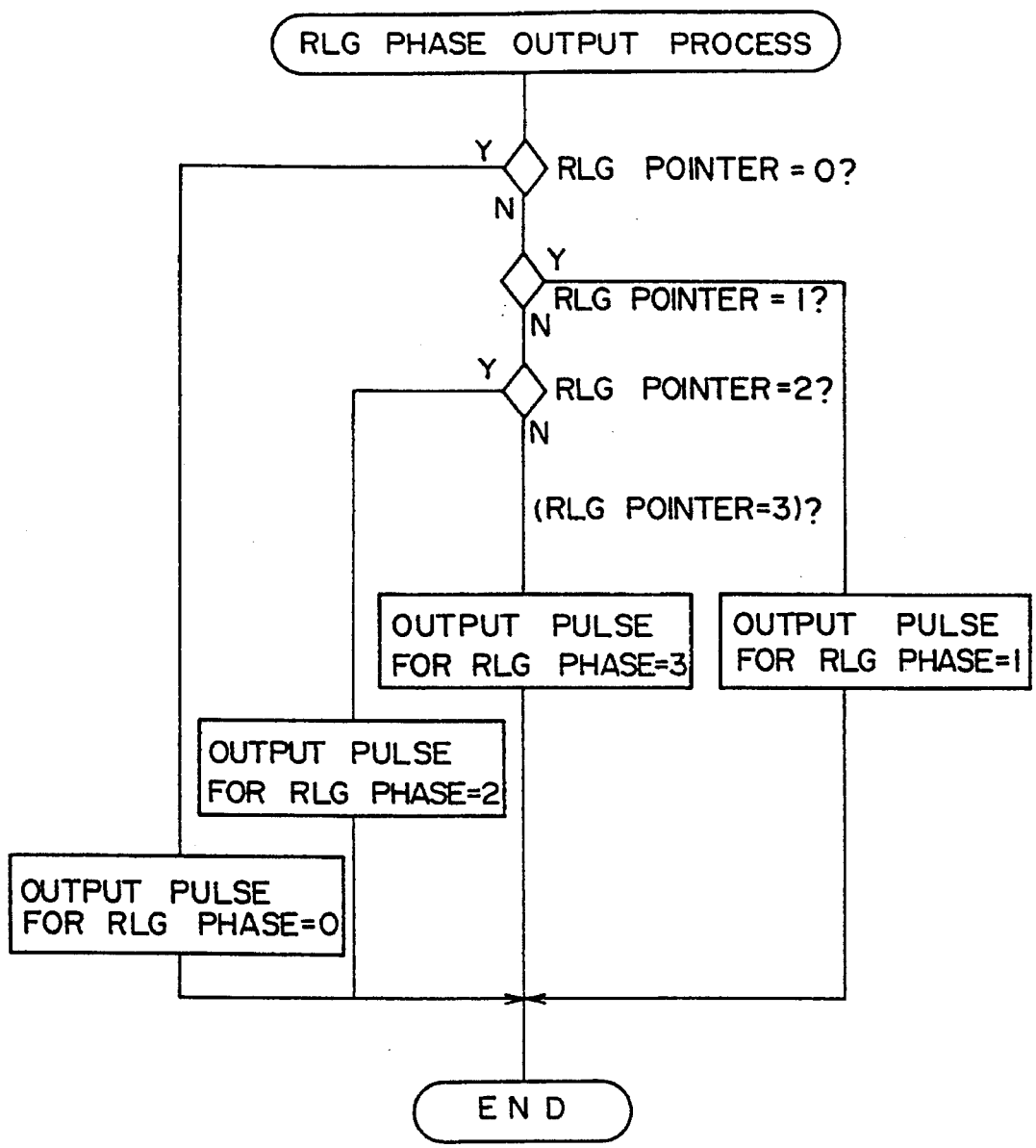
FIG. 8 is a flowchart to show an embodiment of RLG phase output process executed by the lens barrel storage control apparatus of the present invention.

An RLG phase output process at Step 307 is for outputting a predetermined pulse signal for changing the phase of stepping motor 44 into one corresponding to the value of RLG pointer (see FIG. 3), as shown in FIG. 8. When a pulse signal corresponding to the value of RLG pointer is output, the rotator 45 in the stepping motor 44 makes a reverse rotation of one pulse to move the rear lens group 28 forward, as described previously. Then, a lapse of a constant time is waited (Steps 308, 309) and "1" is subtracted from the value of RLG drive counter (Step 310). Above Steps 301 to 310 are repeated a same number of times as the numerical value set in the RLG drive counter, and when the value of RLG drive counter becomes "0", this processing is ended (Step 311). As a result, the rear lens group 28 is located at the rearmost position in the safe area where the RLG cumulative pulse number is "120".

A process at Step 210 in FIG. 5 sets a wait time of 10 ms, which is for stabilizing the stepping motor 44.

Once the rear lens group 28 is set in the safe area as described, the flow proceeds to Step 211 in FIG. 6 to execute a process for retracting the lens barrel 4. First, the drive direction of front lens group 22 is set to the wide-angle (WIDE) (Step 211) and the DC motor (FLG motor) 42 is actuated (Step 212). While the DC motor 42 is driven in the retracting direction, the moving barrel 10 and intermediate barrel 8 are going to be retracted into the stationary barrel 6. During the storage operation of lens barrel 4, the position sensor 24 detects the position of front lens group 22, that is, the position of lens barrel 4 (Step 213), and when the lens barrel 4 reaches the collapsed position (Step 215), a brake is effected on the DC motor 42 (Step 216). During the above operation, a decision is also made at Step 214 as to if the WIDE end drive flag is set. Since this flag is one set at Step 252, the decision is to be "NO" in this case.

The zoom system 2 of this embodiment is so arranged that when the storage of lens barrel 4 is completed, the rear lens group 28 is located at the standby position very close to the home position. Then, after the lens barrel 4 is stored at the retracted position in the camera body 7, the RLG HP drive process is executed to locate the rear lens group 28 at the predetermined standby position (Step 217).

The RLG HP drive process also includes a process for checking if the stepping motor 44 and the home position sensor 36 are normally functioning, in addition to the process for moving the rear lens group 28 to the standby position.

Figure 9A:
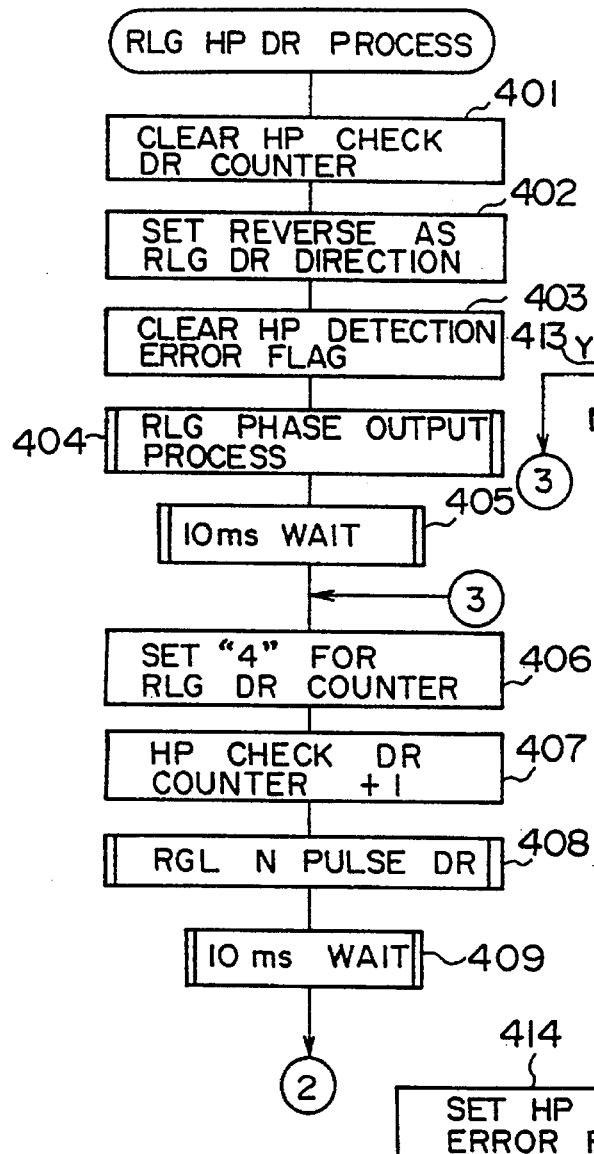
FIGS. 9A and 9B are flowcharts to show an embodiment of RLG N pulse drive process executed by the lens barrel storage control apparatus of the present invention.
Figure 9B:
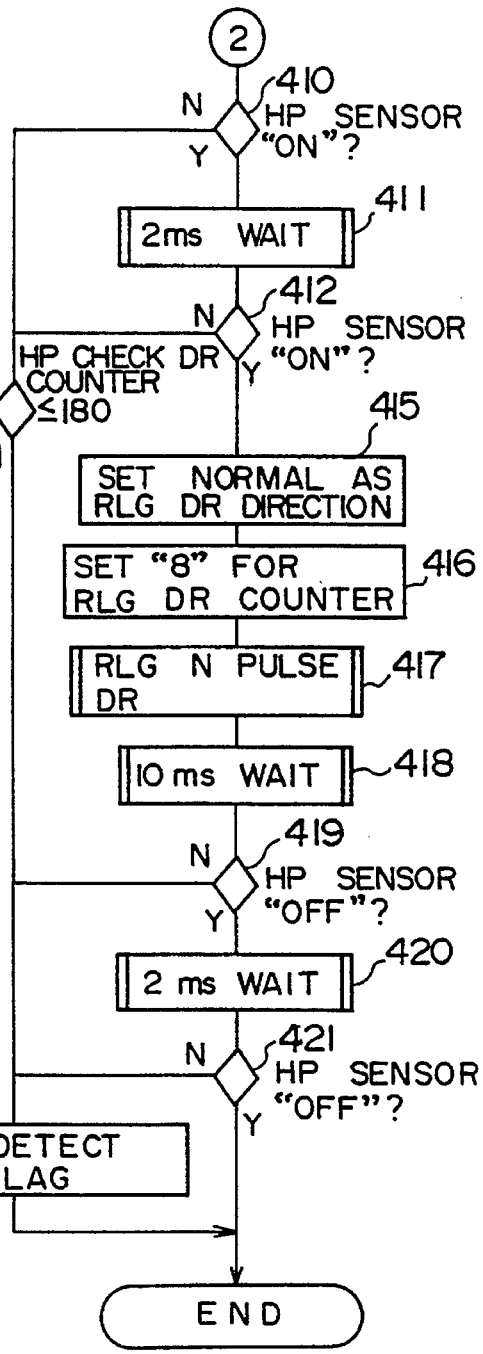

This process will be described in more detail along FIG. 9. A first step clears an HP check drive counter indicating a number of times of drive processes applied to the stepping motor 44 (RLG N pulse drive processes) (Step 401), and the drive direction of stepping motor 44 is set to the reverse direction in order to drive the rear lens group 28 toward the front lens group 22, i.e., forward (Step 402). The HP detection error flag is then cleared (Step 403).

Next, the RLG phase output process is carried out to energize the stepping motor 44 with a phase according to a value of RLG pointer (Step 404). At next Step 405, a wait time of constant time, about 10 ms in the present embodiment, is given to stabilize the energization state of stepping motor 44.

Subsequent steps are a process for driving the stepping motor 44 by N pulses (Steps 406 to 408). Here, N represents a numerical value set in the RLG drive counter at Step 406. Accordingly, since "4" is set in the RLG drive counter in this process, the stepping motor 44 is driven by four pulses so as to move the rear lens group 28 forward by a distance corresponding thereto.

After the RLG N pulse drive process is ended, an on or off condition of the home position sensor 36 is detected after 10 ms elapses (Steps 409 to 412). The present embodiment is arranged, taking a possibility of error operation into consideration, such that the on or off condition of the home position sensor 36 is again detected 2 ms after the first on detection of the home position sensor 36.

If the home position sensor 36 is off, a decision is made as to if a value of HP check drive counter is not more than "180" (Step 413). "1" is added to the HP check drive counter every drive of four pulses of the stepping motor 44 (Step 407). In case the value of this counter is not more than "180", there is a possibility that the rear lens group 28 has not reached the home position yet. This is because 720 pulse signals (180 counters) must be sent to the stepping motor 44 in order to move the rear lens group 28 from the most distant position from the home position, to the home position.

If the home position sensor 36 is off and if the HP check drive counter is not more than "180", it can be considered that the rear lens group 28 has not reached the home position yet, and therefore Steps 406 to 412 are repeated. Then, if the home position sensor 36 is off and if the HP check drive counter exceeds "180", an HP detection error flag is set under an assumption that there is something abnormal in drive of RLG 28 (Step 414), and the flow leaves this process. Of course, in this case, no specific problem occurs with HP detection error flag being set, because the lens barrel 4 is already stored at the collapsed position. Nevertheless, it is preferable that the setting of this flag is arranged to be detected in another subsequent process (for example, in SM "ON" process at Step 112 in FIG. 4).

On the other hand, if the value of HP check drive counter is within "180" and if the home position sensor 36 is turned on, the rear lens group 28 is moved to the standby position which is away from the home position toward the camera body by several pulses. Here, suppose the rear lens group is moved eight pulses. First, the drive direction of stepping motor 44 is set to the normal rotation direction (Step 415) and "8" is set in the RLG drive counter (Step 416). Then, the RLG N pulse drive process is executed (Step 417) and thereafter the flow waits a lapse of about 10 ms to stabilize the energization state of stepping motor 44 (Step 418). In the RLG N pulse drive process, the flow goes from Step 301 to Step 312 in FIG. 7 to repeat Steps 301 to 311 eight times.

When the rear lens group 28 is moved to the standby position as described, the home position sensor 36 is turned off if there is nothing abnormal. However, if the home position sensor 36 is still kept on even after the double on or off detections of the home position sensor 36 (Steps 419 to 421), an HP detection error flag is set under an assumption that there is something abnormal (Step 414).

If the home position sensor 36 is off at Steps 419 to 421, which is normal, the flow leaves the RLG HP drive process without setting an HP detection error flag.

After that, the flow goes to Step 218 in FIG. 6 to execute the clearing process of WIDE end drive flag and to turn off the drive power source of zoom system 2 (Step 219), and when an off state of main switch (SM) is confirmed (Step 221), the processing is ended.

Next described are cases where the BCNG flag or HP detection error flag is set.

The BCNG flag is a flag as set when the voltage of battery 50 is insufficient, that is, when the drive voltage of stepping motor 44 is lower than a predetermined value. When this flag is set, the stepping motor 44 could be in a step-out state, and then an actual position of rear lens group 28 might be different from the position thereof obtained from the RLG cumulative pulse number. If the processes after Step 206 are executed in such an abnormal state, such a possibility is high that the rear lens group 28 is not located in the safe area so that the rear lens group will come into contact with the film F in storage of lens barrel.

Accordingly, before detecting the position of rear lens group 28 from the RLG cumulative pulse number at Step 206, a decision is made at Step 203 as to if the BCNG flag is set, and if the decision is affirmative, the flow proceeds to Step 250 to execute the aforementioned RLG HP drive process to check the operation of stepping motor 44.

The RLG HP drive process is executed in another process such as the telephoto-side zooming process at Step 111 in FIG. 4, and in the process an HP detection error flag could be set. In such a case the flow also goes from Step 204 to Step 250, because the position of rear lens group 28 obtained from the RLG cumulative pulse number is not reliable.

After execution of the RLG HP drive process at Step 250, the HP detection error flag will be cleared if there is no abnormality in the zoom system 2, and the rear lens group 28 is located at the standby position very close to the front lens group 22. Accordingly, even if the lens barrel 4 is retracted into the retracted position in the camera body 7, proceeding from Step 251 to Step 211 in FIG. 6, the rear lens group 28 will not come into contact with the film F.

On the other hand, if the HP detection error flag is set in the RLG HP drive process (Step 414 in FIG. 9), a WIDE end drive flag is set before proceeding to Step 211, because there is something abnormal in the zoom system 2 (Step 252).

With this WIDE end drive flag set, the DC motor 42 is driven to retract the lens barrel 4 similarly as in the above process (Steps 211–214, 253), and when the front lens group 22 reaches the wide-angle (WIDE) end, a brake is applied to the DC motor 42 (Step 254).

As described above, the front lens group 22 stops at the position of WIDE end as shown in FIG. 1B, if there is something abnormal in drive of rear lens group 28 or in the home position sensor 36. As seen from FIG. 1B, the rear lens group 28 will never contact the film F in this state even if it is located closest to the camera body.

After that, the WIDE end drive flag is cleared (Step 218), the drive power source for zoom system 2 is turned off (Step 219), it is checked if the main switch (SM) is off (Step 221), and the process is ended.

Figure 10:
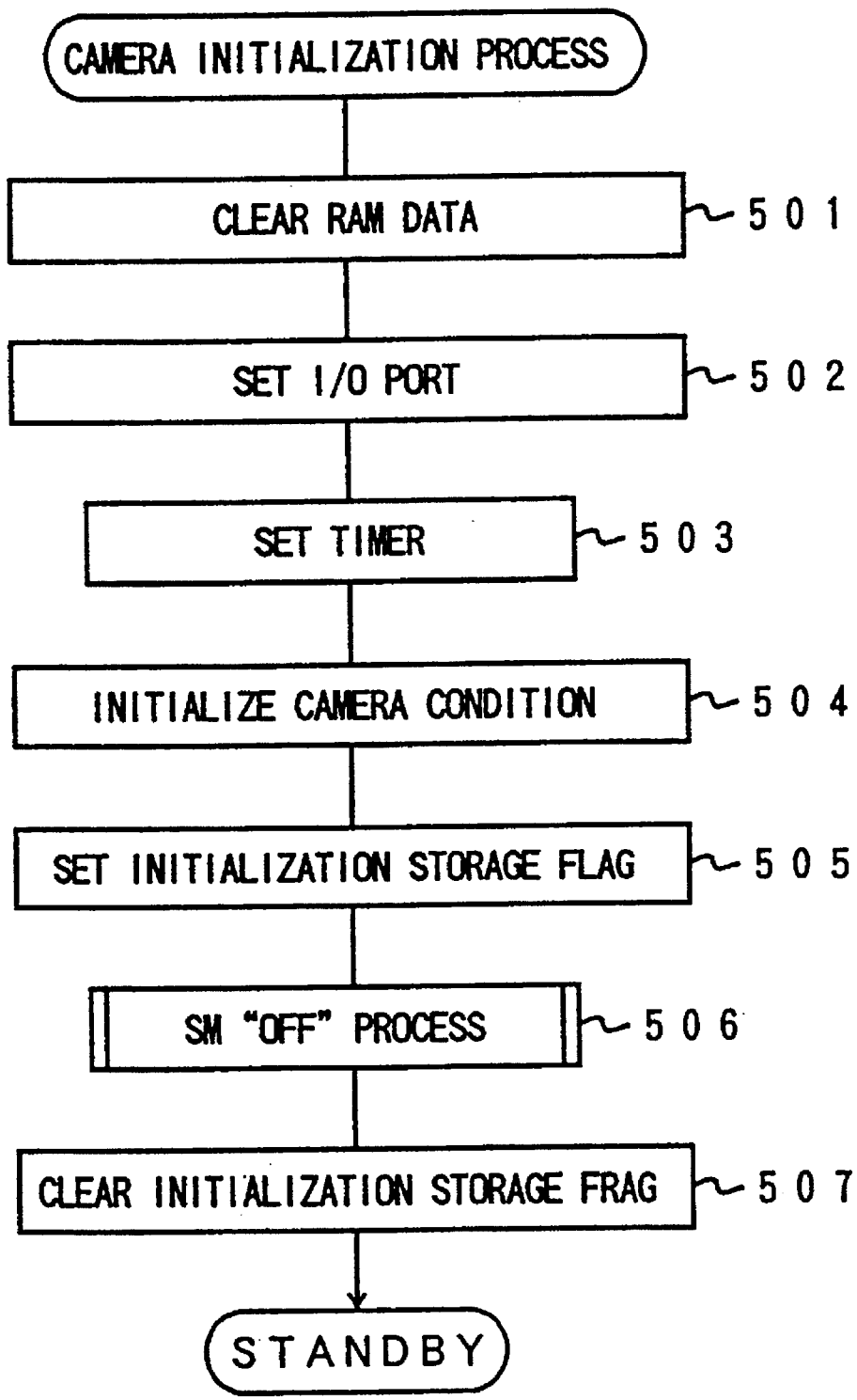
FIG. 10 is a flowchart to show an embodiment of camera initialization process.

The above description concerned the process executed when the user turned off the main switch (SM), but the SM "OFF" process is also executed in the camera initialization process, for example in exchange of battery 50 or the like. The camera initialization process includes a process for clearing data in RAM in camera, as shown in FIG. 10 (Step 501). The RAM data also includes the RLG cumulative pulse number, and, therefore, if the RAM data is cleared the position of rear lens group 28 becomes unobtainable from the RLG cumulative pulse number.

Accordingly, after executing I/O port setting (Step 502), timer setting (Step 503) and camera condition initialization (Step 504), an initialization storage flag is set (Step 505), and the SM "OFF" process is executed at Step 506 where the flow proceeds from Step 205 to Step 250 in FIG. 5. Processing after this process is almost same as in the case that the BCNG flag or HP detection error flag is set, but since the initialization storage flag is set, the flow leaves the SM "OFF" process at Step 220 in FIG. 6, the initialization storage flag is cleared (Step 507 in FIG. 10), and the camera initialization process is ended.

Although the above embodiment is so arranged that with an anomaly in the zoom system 2 the retraction is stopped when the front lens group 22 reaches the WIDE end, in order to minimize a projection amount of lens barrel 4, it can be stopped at any position within a photographable range while preventing the rear lens group 28 from contacting the film F.

The preferred embodiment of the present invention was described above in detail, but it is needless to say that the present invention is not limited to the above embodiment. For example, the above embodiment is so arranged that the final standby position of rear lens group 28 is a position several pulses away from the home position, but the standby position may be any position where no interference occurs between the rear lens group 28 and the film F when the lens barrel 4 is stored at the collapsed position.

Also, the lens barrel 4 of zoom system 2 in the above embodiment is of the three-barrel arrangement composed of the stationary barrel 6, the intermediate barrel 8 and the moving barrel 8, but the present invention can be applied to a two-barrel structure composed of a stationary barrel and a moving barrel.

As described above, the present invention excludes the possibility that the rear lens group 28 comes into contact with a film F upon storage of lens barrel 4 in two-group zoom system 2, of course, and shortens the time for storage start of the lens barrel itself as well. Therefore, a wait time becomes shorter after the user turned off the main switch and before the lens barrel 4 is stored in the camera body 7, which improves the feeling upon use of camera.

Also, if the position of rear lens group 28 is lost with some anomaly occurring in drive of rear lens group 28, the lens barrel 4 is not retracted to the retracted position in the camera body 7 but is located at a position in a photographable state. When the lens barrel 4 is located at the position in the photographable state, the rear lens group will never contact the film F, which can prevent the film, the rear lens group 28 or other camera constituents from being damaged in retracting the lens barrel 4.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A camera comprising:

a camera body;

a lens barrel arranged as movable backward and forward relative to said camera body;

a first motor for driving said lens barrel;

a front lens group coaxially mounted in a front end portion of said lens barrel;

a rear lens group coaxially disposed in said lens barrel behind said front lens group so as to be independently movable backward and forward;

a second motor for driving said rear lens group; and a lens barrel storage control apparatus for controlling said first motor and said second motor in storing said lens barrel at a retracted position in said camera body, said lens barrel storage control apparatus including:

(i) rear lens group position detecting means for detecting a position of said rear lens group with respect to said lens barrel;

(ii) means for driving said first motor to retract said lens barrel to the retracted position in said camera body, if said rear lens group position detecting means detects that said rear lens group is located within a safe area in said lens barrel where said rear lens group will never come into contact with a film in retracting said lens barrel to the retracted position in said camera body; and (iii) means for driving said first motor and said second motor to retract said lens barrel to the retracted position in said camera body after locating said rear lens group at a predetermined rear position in said safe area, if said rear lens group position detecting means detects that said rear lens group is not located within said safe area.

2. A camera according to claim 1, wherein said lens barrel storage control apparatus includes means for driving said second motor to locate said rear lens group at a predetermined front position within said safe area close to said front lens group after said lens barrel is stored at the retracted position in said camera body.

3. A camera according to claim 1, wherein said lens barrel is of a telescopic structure.

4. A camera according to claim 1, wherein said first motor is a direct current motor.

5. A camera according to claim 1, wherein said second motor is a stepping motor.

6. A camera according to claim 5, wherein said rear lens group position detecting means detects a position of said rear lens group based on a cumulative number of pulse signals output to said stepping motor, the cumulative number of pulse signals being a certain value when said rear lens group is located at a reference position which is a position closest to said front lens group.

7. A camera according to claim 6, wherein said lens barrel storage control apparatus includes:

abnormality detecting means for detecting an abnormal state in which an actual position of said rear lens group is not coincident with the position detected by said rear lens group position detecting means, before said rear lens group position detecting means starts detection of the position of said rear lens group;

rear lens group moving means for driving said second motor to move said rear lens group to said reference position, if said abnormality detecting means detects said abnormal state;

reference position detecting means for detecting whether said rear lens group having been moved by said rear lens group moving means is normally located at said reference position;

means for driving said first motor to retract said lens barrel to the retracted position in said camera body, if said reference position detecting means detects that said rear lens group is normally located at said reference position; and means for driving said first motor to locate said lens barrel at a suitable position within a range where said lens barrel can be located in a photographable condition, if said reference position detecting means detects that said rear lens group is not normally located at said reference position.

8. A camera according to claim 7, wherein said abnormality detecting means measures a drive voltage of said stepping motor and detects said abnormal state by detecting that a measurement value is not more than a predetermined value.

9. A camera according to claim 7, wherein said abnormality detecting means detects said abnormal state by detecting an abnormality caused during a zooming operation.

10. A camera according to claim 7, wherein said abnormality detecting means detects said abnormal state by detecting that the camera is in a state immediately after initialization.

11. A lens barrel storage control apparatus for use in a camera having a camera body, a lens barrel arranged as movable backward and forward relative to said camera body, a first motor for driving said lens barrel, a front lens group coaxially mounted in a front end portion of said lens barrel, a rear lens group coaxially disposed in said lens barrel behind said front lens group so as to be independently movable backward and forward, and a second motor for driving said rear lens group, said lens barrel storage control apparatus for controlling said first motor and said second motor in storing said lens barrel at a retracted position in said camera body, comprising:

rear lens group position detecting means for detecting a position of said rear lens group with respect to said lens barrel;

means for driving said first motor to retract said lens barrel to the retracted position in said camera body, if said rear lens group position detecting means detects that said rear lens group is located within a safe area in said lens barrel where said rear lens group will never come into contact with a film in retracting said lens barrel to the retracted position in said camera body; and means for driving said first motor and said second motor to retract said lens barrel to the retracted position in said camera body after locating said rear lens group at a predetermined rear position in said safe area, if said rear lens group position detecting means detects that said rear lens group is not located within said safe area.

12. A lens barrel storage control apparatus according to claim 11, comprising means for driving said second motor to locate said rear lens group at a predetermined front position within said safe area close to said front lens group after said lens barrel is stored at the retracted position in said camera body.

13. A lens barrel storage control apparatus according to claim 11, wherein in case that said second motor is a stepping motor, said rear lens group position detecting means detects a position of said rear lens group based on a cumulative number of pulse signals output to said stepping motor, the cumulative number of pulse signals being a certain value when said rear lens group is located at a reference position which is a position closest to said front lens group.

14. A lens barrel storage control apparatus according to claim 13, comprising:

abnormality detecting means for detecting an abnormal state in which an actual position of said rear lens group is not coincident with the position detected by said rear lens group position detecting means, before said rear lens group position detecting means starts detection of the position of said rear lens group;

rear lens group moving means for driving said second motor to move said rear lens group to said reference position, if said abnormality detecting means detects said abnormal state;

reference position detecting means for detecting whether said rear lens group having been moved by said rear lens group moving means is normally located at said reference position;

means for driving said first motor to retract said lens barrel to the retracted position in said camera body, if said reference position detecting means detects that said rear lens group is normally located at said reference position; and means for driving said first motor to locate said lens barrel at a suitable position within a range where said lens barrel can be located in a photographable condition, if said reference position detecting means detects that said rear lens group is not normally located at said reference position.

15. A lens barrel storage control apparatus according to claim 14, wherein said abnormality detecting means measures a drive voltage of said stepping motor and detects said abnormal state by detecting that a measurement value is not more than a predetermined value.

16. A lens barrel storage control apparatus according to claim 14, wherein said abnormality detecting means detects said abnormal state by detecting an abnormality caused during a zooming operation.

17. A lens barrel storage control apparatus according to claim 14, wherein said abnormality detecting means detects said abnormal state by detecting that the camera is in a state immediately after initialization.

18. A lens barrel storage control method for use in a camera having a camera body, a lens barrel arranged as movable backward and forward relative to said camera body, a first motor for driving said lens barrel, a front lens group coaxially mounted in a front end portion of said lens barrel, a rear lens group coaxially disposed in said lens barrel behind said front lens group so as to be independently movable backward and forward, and a second motor for driving said rear lens group, said lens barrel storage control method comprising the steps of:

detecting a position of said rear lens group with respect to said lens barrel;

driving said first motor to retract said lens barrel to the retracted position in said camera body, when detecting that said rear lens group is located within a safe area in said lens barrel where said rear lens group will never come into contact with a film in retracting said lens barrel to the retracted position in said camera body; and driving said first motor and said second motor to retract said lens barrel to the retracted position in said camera body after locating said rear lens group at a predetermined rear position in said safe area, when detecting that said rear lens group is not located within said safe area.

19. A lens barrel storage control method according to claim 18, comprising the step of driving said second motor to locate said rear lens group at a predetermined front position within said safe area close to said front lens group after said lens barrel is stored at the retracted position in said camera body.

20. A lens barrel storage control method according to claim 18, wherein in case that said second motor is a stepping motor, a position of said rear lens group is detected on the basis of a cumulative number of pulse signals output to said stepping motor, the cumulative number of pulse signals being a certain value when said rear lens group is located at a reference position which is a position closest to said front lens group.

21. A lens barrel storage control method according to claim 20, comprising the steps of:

detecting an abnormal state in which an actual position of said rear lens group is not coincident with the position detected on the basis of a cumulative number of pulse signals output to said second motor, before starting detection of the position of said rear lens group;

driving said second motor to move said rear lens group to said reference position, when detecting said abnormal state;

detecting whether said rear lens group having been moved by said rear lens group moving means is normally located at said reference position;

driving said first motor to retract said lens barrel to the retracted position in said camera body, when detecting that said rear lens group is normally located at said reference position; and driving said first motor to locate said lens barrel at a suitable position within a range where said lens barrel can be located in a photographable condition, when detecting that said rear lens group is not normally located at said reference position.

* * * * *